W. A. GENSCH.
Lamp Wick.
No. 81,359.
Patented Aug. 25, 1868.
Witnesses:
Wm A. Morgan
G. C. Cotton
Inventor:
W. A. Gensch
per Munn & Co
Attorneys

UNITED STATES PATENT OFFICE.

WILHELM AUGUST GENSCH, OF NEW YORK, N. Y.

IMPROVEMENT IN LAMP-WICKS.

Specification forming part of Letters Patent No. 81,359, dated August 25, 1868.

*To all whom it may concern:*

Be it known that I, WILHELM AUGUST GENSCH, of the city, county, and State of New York, have invented a new and Improved Lamp-Wick; and I do hereby declare that the following is a full, clear, and exact description thereof, which will enable those skilled in the art to make and use the same, reference being had to the accompanying drawings, forming part of this specification, in which the drawing represents a side view of my improved lamp-wick.

This invention relates to a new lamp-wick which is composed of animal and vegetable fiber, felted together so as to be more effective and useful than those now generally made, and steeped in a composition composed of the ingredients hereinafter enumerated, whereby a clearer light is produced than by ordinary lamp-wicks.

Wicks are now generally made of vegetable fiber woven together. Such wicks will, when ignited, be expanded.

In my wicks the animal fiber will, on the burning edge, be at once burned so as to form a crust on the upper end of the wick. This crust causes the contraction of the burning part of the wick, whereby the unsteadiness of the flame is prevented, and whereby the oil is allowed to burn quietly on the said crust. The crust is porous enough to let the oil through, and still strong enough to keep the wick end contracted.

The wick is composed, as aforesaid, of animal and vegetable fiber, such as hare's hair or lamb's wool, and cotton, or any other suitable composition of such aforesaid fiber. These fibers are felted together in the well-known or in any suitable manner.

I prefer to treat them, before felting, with a solution of mercury, arsenic, copper, and nitric acid, but do not confine myself to this mixture.

The felted material, which is made up in large sheets, or in already-formed wicks, as may be desired, is or may then be steeped in a mixture of zinc, saltpeter, and aniline, dissolved in sulphuric acid. The aniline is only for giving the color, and may be omitted.

I have found that by this composition a brighter and more beautiful flame is produced.

I claim as new and desire to secure by Letters Patent—

The lamp-wick composed of animal and vegetable fiber, and steeped in the composition composed of the ingredients herein set forth, in the manner and for the purpose specified.

W. A. GENSCH.

Witnesses:
A. V. BRIESEN,
ALEX. F. ROBERTS.